United States Patent [19]
Wahl et al.

[11] 3,815,560
[45] June 11, 1974

[54] IGNITION SYSTEM FOR INTERNAL COMBUSTION ENGINES

[75] Inventors: Josef Wahl; Heinz Moller, both of Stuttgart; Heinz Kammerer, Nellingen; Richard Zechnall, Stuttgart-Nord, all of Germany

[73] Assignee: Robert Bosch GmbH, Stuttgart, Germany

[22] Filed: Oct. 16, 1972

[21] Appl. No.: 298,108

[30] Foreign Application Priority Data
Mar. 9, 1972 Germany................... 2211315

[52] U.S. Cl...... 123/117 R, 123/117 A, 123/148 E, 123/32 EA
[51] Int. Cl............................ F02p 5/04, F02b 3/00
[58] Field of Search....... 123/117 R, 117 A, 32 EA, 123/11.2

[56] References Cited
UNITED STATES PATENTS

| | | | |
|---|---|---|---|
| 3,665,900 | 5/1972 | Schlimme | 123/1 |
| 3,716,035 | 2/1973 | Adler | 123/32 EA |
| 3,718,123 | 2/1973 | Eckert | 123/32 EA |
| 3,718,126 | 2/1973 | Oishi | 123/117 A |
| 3,750,632 | 8/1973 | Zechnall | 123/117 R |

Primary Examiner—Laurence M. Goodridge
Assistant Examiner—Ronald B. Cox
Attorney, Agent, or Firm—Flynn & Frishauf and William R. Woodward

[57] ABSTRACT

The timing of the distributor is adjusted by an electro-mechanical control loop in dependence on engine speed, intake manifold vacuum, exhaust gas composition, throttle position, or the like and includes electrical transducers to sense the parameters and electrical control amplifiers to provide output signals which are a composite of sensed and applied signals representative of the parameters and which control a force transducer to provide an output operating force acting on the distributor to control the timing of the ignition breaker points in dependence on a selected operating parameter, or on operating parameters, the loop preferably including a feedback branch to maintain the breaker operation in synchronism with engine rotation.

35 Claims, 16 Drawing Figures

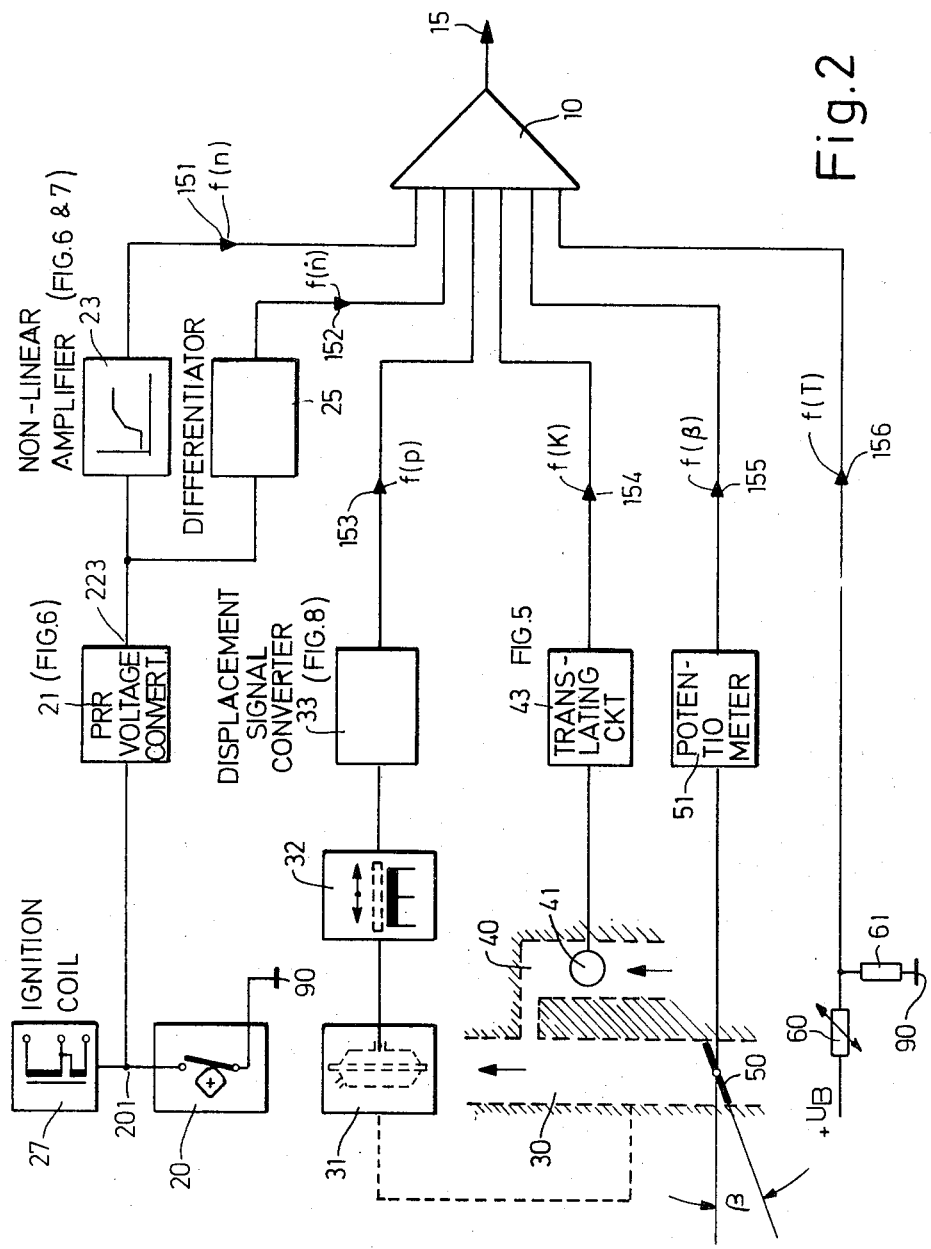

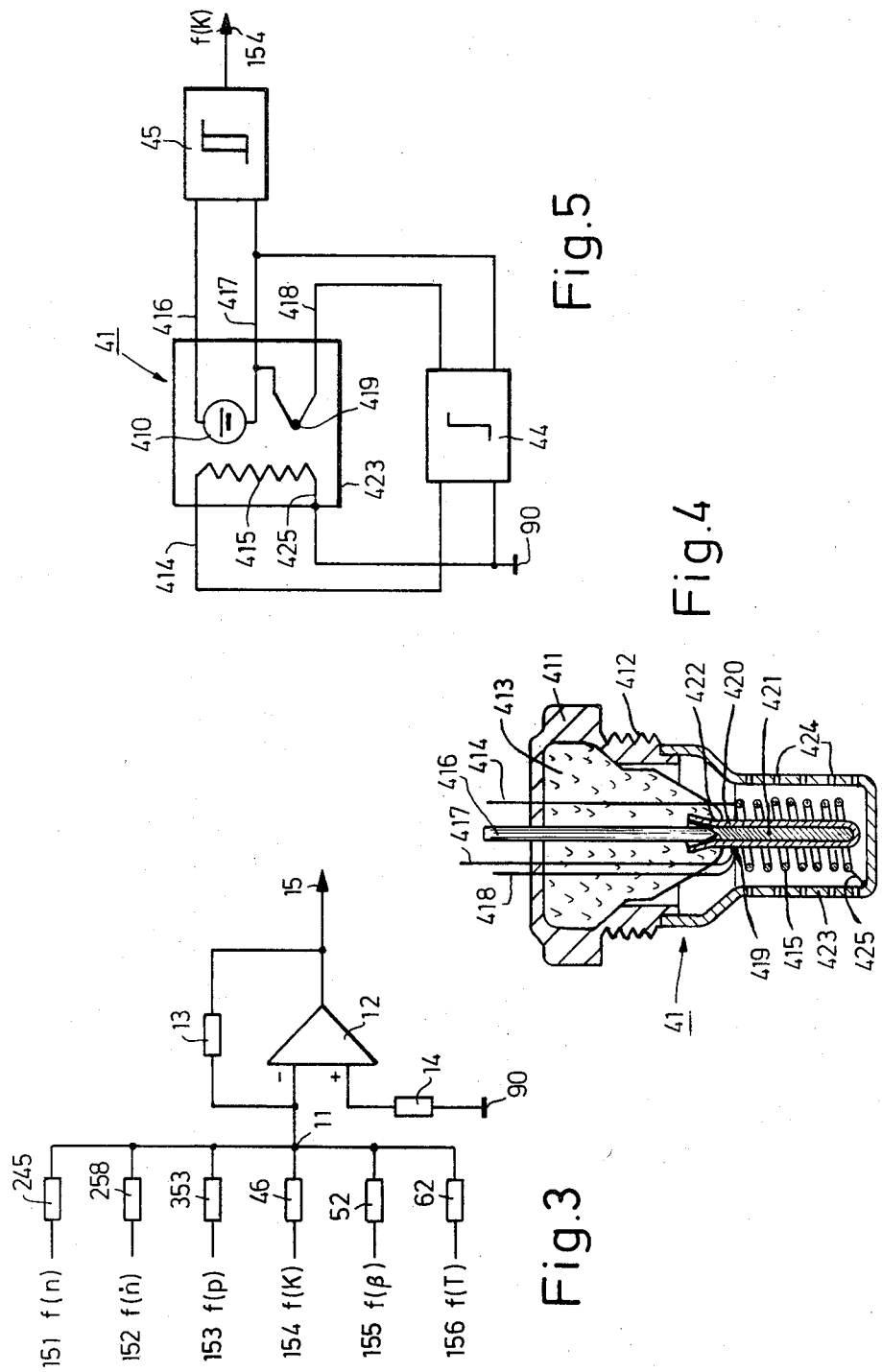

IGNITION SYSTEM FOR INTERNAL COMBUSTION ENGINES

CROSS REFERENCE TO RELATED PATENT AND APPLICATIONS

U.S. Pat. No. 3,483,851, Reichardt, Dec. 16, 1969
U.S. Ser. No. 239,740, now U.S. Pat. No. 3,745,768 filed Mar. 30, 1972, Zechnall et al.
U.S. Ser. No. 259,157, filed June 2, 1972, Schmidt et al.
U.S. Ser. No. 265,547, now U.S. Pat. No. 3,759,232 filed June 23, 1972, Wahl et al.
U.S. Ser. No. 259,134, filed June 2, 1972, Topp et al.
U.S. Ser. No. 259,254, now U.S. Pat. No. 3,782,347 filed June 2, 1972, Schmidt et al.
U.S. Ser. No. 267,562, filed May 6, 1972, Eichler et al.
U.S. Ser. No. 266,673, filed June 27, 1972, Eichler et al.
U.S. Ser. No. 282,848, filed Aug. 22, 1972, Eichler et al.
U.S. Ser. No. 283,177, filed August 23, 1972, Eichler et al.
U.S. Ser. No. 271,009, filed July 12, 1972, Scholl
U.S. Ser. No. 300,047, filed Oct. 24, 1972, Linder et al.

The present invention relates to an ignition system for an internal combustion engine of the Otto type and more particularly to a multicylinder internal combustion engine in which a distributor has a mechanically operable breaker, the distributor being arranged so that the timing of the ignition pulses can be adjusted with respect to piston dead-center position.

Distributors for internal combustion engines are usually made to be adjustable so that the timing of the ignition pulse to cause a spark at the spark plugs of the internal combustion engine can be adjusted with respect to piston position. This adjustment may occur, for example, in dependence on engine speed, or other engine operating parameters, such as intake manifold pressure (or, rather, vacuum). The ignition timing, that is, the respective relationship of ignition pulse and piston dead center position is usually controlled by mechanically interrupting the ignition current and mechanically distributing the high voltage pulses. The ignition timing is usually exactly determined with respect to speed and load on the internal combustion engine. The timing, if well adjusted, is so arranged that the air-fuel mixture is burned as effectively as possible to provide for economical and efficient operation of the engine over the entire speed and load range of the engine.

Efficient and economical operation over wide ranges of load and speed are not the only necessary and desirable characteristics of an internal combustion engine. In addition, and particularly due to the multiplying use of such engines in automotive vehicles, the exhaust emission from the engine must also be as free from polluting gases as possible. This requires additional and effective control not only of the engine but also of its associated equipment, such as the ignition system.

It is an object of the present invention to provide an ignition system for internal combustion engines which is capable of responding to all important operating conditions and parameters of the engine, and thus also to the composition of the exhaust gases, so that the ignition and ignition timing of the engine can be controlled in a control circuit for optimum performance of the engine with respect to any one, or all requirements regarding power, efficiency and freedom from emitting polluting exhaust gases. Additionally, the ignition system should be so arranged that it can be controlled readily and does not require special apparatus, and is less expensive than currently proposed thyristor or entirely transistorized ignition systems.

SUBJECT MATTER OF THE PRESENT INVENTION

Briefly, the distributor is provided, as usual, with breaker contacts and is adjustable with respect to crank shaft position. An electromechanical control loop is provided to control the timing of the breaker of the ignition contacts in dependence of at least one of the operating parameters of the engine which includes speed, intake manifold vacuum, exhaust gas composition, throttle opening, engine temperature, engine acceleration and the like. Electrical output signals are obtained from transducers responsive to the various mentioned parameters; at least one of them is used, and preferably more than one or all of the signals are applied to an electrical controlled amplifier which amplifies the signals and, in turn, controls an electro-mechanical device to properly adjust the timing of the breaker contacts of the distributor with respect to engine crank shaft position. Preferably, and in accordance with a feature of the invention, the various signals are summed and a composite control signal is derived which is representative of the desired control effect, to set the timing of the distributor in accordance with sensed operating conditions or parameters of the engine.

In one embodiment of the invention an electrical control loop is provided which includes a control amplifier, a power amplifier, and an electromagnetic or solenoid system including a control valve to set a vacuum operating system to provide a servo-output source to adjust the position of the breaker points on the breaker shaft, and thus to determine the proper timing of the ignition pulse. In accordance with a feature of the invention, a feedback loop is provided which includes a signal representative of engine rotation in the loop to provide for synchronism of engine rotation and ignition pulses.

In accordance with a feature of the invention, an electronic function generator is provided to which the various output signals, representative of engine operation parameters are applied, the function generator providing the composite output signal which functions as a command signal to be applied to the control loop to set the distributor timing.

The invention will be described by way of example with reference to the accompanying drawings, wherein:

FIG. 2 is a more detailed diagram illustrating a function generator and transducers to provide output signals representative of operating parameters;

FIG. 3 illustrates a preferred embodiment of a function generator;

FIG. 4 is a transverse schematic cross sectional view of an exhaust gas sensing transducer;

FIG. 5 is a schematic circuit diagram to obtain output voltage depending on sensed composition of exhaust gases;

Figure 1:
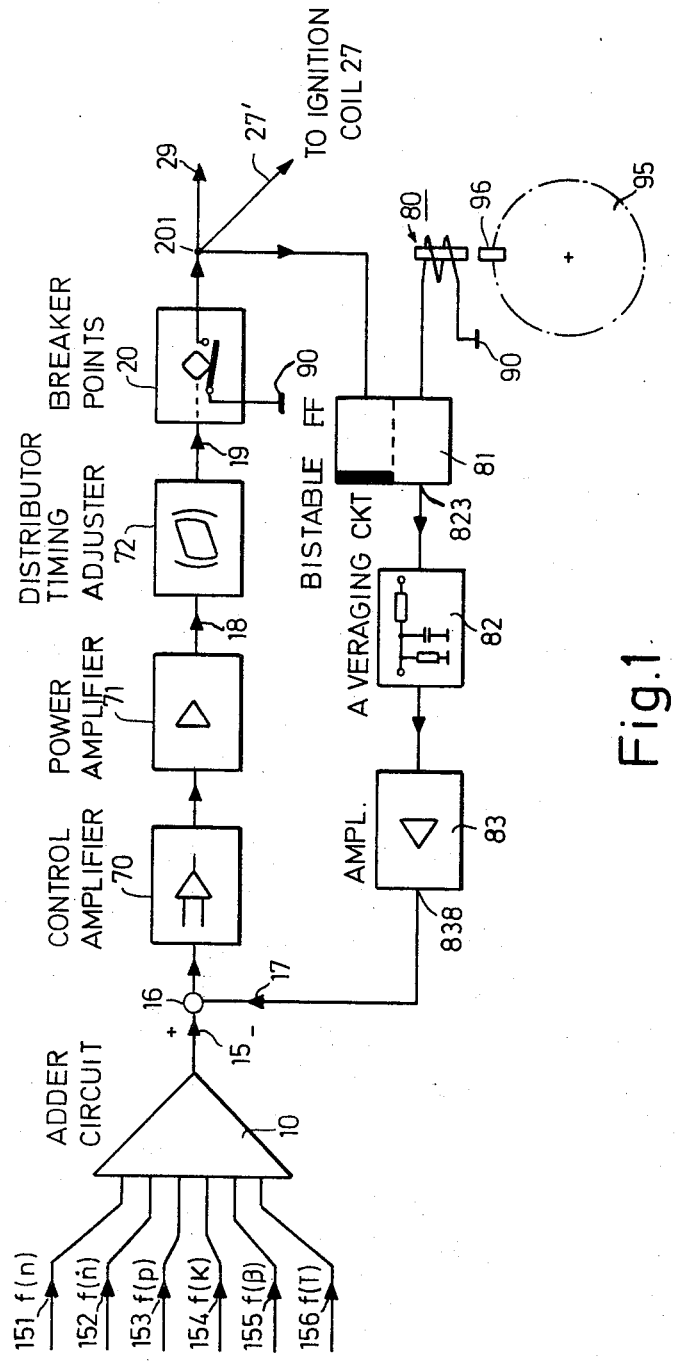
FIG. 1 is a schematic block diagram of the control circuit to regulate the ignition timing of an internal combustion engine.

A signal 15 (FIG. 1) is generated at the output of a control input source 10, operating as a function generator, which, in this embodiment, is a summing amplifier. The control signal 15 is derived as a composite of a plurality of sensed signals 151, 152, 153, 154, 155, 156. These signals, in turn, are derived from transducers which sense operating conditions of the internal combustion engine and provide output signals corresponding to various characteristic parameters of the operating conditions. Thus, signal 151 is a function of the speed n of the engine; signal 152 is a function of the rate of change, that is, the derivative n and can be derived from a rotating element of the internal combustion engine, for example, by differentiating the speed signal 151; signal 153 is a function of inlet manifold vacuum $p$; signal 154 is representative of the composition of the exhaust gases K; signal 155 is representative of the angular position $\beta$ of the throttle; and signal 156 is a function of temperature P measured at a suitable point of the internal combustion engine. The combined summed signal 15 is applied at a summing point 16, which may be again a summing amplifier, of the control loop, and applied to a control amplifier 70. The output of the control amplifier 70 is applied to a power amplifier 71. The output from power amplifier 71 provides controlled output power 18 which is connected to an electrical positioning element, such as a rotary magnet system 72 in which a mechanical servo-power output 19 is derived. The element 72, which functions as the distributor timing adjuster, may be any type of electrical-mechanical power conversion equipment, for example, a linear push-pull position converter, a magnetic pressure system or the like. The output servo-power 19 is utilized to set either the rotating or the fixed portion of the distributor of the internal combustion engine, which may be essentially of the well known type, and which has breaker points 20, the relative position of which with respect to a crank shaft is to be changed. An ignition coil 27 (FIG. 2) is connected to a line 27', connected to an output terminal 201 from the breaker points, forming the ignition pulse generator 20. Junction 201 will further have a signal 29 appearing thereat which is representative of the breaker point repetition rate, that is, of the rate of ignition pulses being supplied by the points 20. This signal is utilized in a feedback branch of the control loop and is applied to an input of a bi-stable flipflop 81. Another input of bi-stable flipflop 81 has pulses applied thereto derived from a pulse source 80 which has a coil portion secured to a fixed point of the internal combustion engine, and a magnet portion 96 secured to the rotating part of the engine, for example, the flywheel 95. The ferromagnetic material 95 provides a change in magnetic flux through the coil of pulse source 80 (one side of which is grounded to chassis 90), to be applied to bi-stable flipflop 81. Output 823 of flipflop 81 is connected to an averaging circuit 82 to provide an average output signal which is amplified in amplifier 83 and connected from its output 838 as a feedback control signal 17 to the summing point 16, and thus to control amplifier 70.

The control system of FIG. 1 is so arranged that any possible undesired variations from design values, such as tolerances, and effects due to wear and tear and ageing are compensated, by feeding back a signal representative of the actual ignition timing, as represented by operation of the breaker points 20 and comparing this timing with the control signal 15 which is applied to control amplifier 70. The summed signal representative of a control value 15 is derived from circuits shown in detail in FIG. 2. The breaker-pulse source 20 is connected at one side to ground or chassis 90. At terminal 201, connected to ignition coil 27, pulses will appear which have a repetition rate representative of engine speed $n$. These pulses are applied to the pulse repetition rate - voltage converter 21 (disclosed in more detail in FIG. 6), the output of which is applied over line 223 to a non-linear amplifier 23 having an amplification - signal characteristic approximately as indicated in the block of element 23 and is shown in more detail in FIG. 7. The output of non-linear amplifier 23 then is a voltage which is a function $f(n)$, as indicated at 151, representative of engine speed and applied to circuit 10. The output of the voltage converter 21 is additionally implied to a differentiator 25 in which output voltage 152 which is a function of the first derivative of engine speed, that is, of engine acceleration is provided, as indicated schematically by $f(n)$. The breaker points 20 thus have a plurality of functions: they provide a pulse sequence which is used to provide a signal representative of engine speed, another signal representative of engine acceleration, and which further provides interrupted current to the ignition coil to provide ignition pulses. Additionally, the pulses are used in a feed-back circuit (FIG. 1).

The intake manifold 30 has a pressure transducer, illustrated as a diaphragm chamber 31 coupled thereto. The mechanical output from the diaphragm chamber 31 is applied to an inductive transducer 32, the output of which is applied to a displacement signal converter 33. The output of converter 33 provides a signal 153 which is a function of the vacuum in inlet manifold 30 behind the throttle, in the direction of air flow.

A duct 40, having exhaust gases passing therethrough and in the present example being connected behind the throttle to the inlet manifold, has a gas sensing element 41 therein, which is so constructed that it senses the composition of exhaust gases. The output from element 41 is connected to a translating circuit 43 which provides an output signal 154 which is a function $f(K)$ of the composition of the exhaust gases.

The throttle 50 itself can change its angular position with respect to inlet manifold 30 and this angular position transduced by a potentiometer 51, coupled thereto which provides an output voltage 155 which is a function $f(\beta)$.

A temperature sensing element, shown as a temperature sensitive resistor 60 is coupled to the engine in temperature-conductive relationship, and connected on the one hand to a source of positive potential and on the other over a bleeder resistor 61 to chassis 90. The output voltage 156 will be a function of temperature $f(T)$.

The signals derived from the sensing elements, and representative of engine operating parameters, are all applied to the function generator 10.

Other, and additional parameters representative of engine operations, or ambient engine operations may be applied to the function generator 10, such as average air pressure (to compensate for altitude variations), ambient temperature, and the like.

Specific examples of the circuits and components utilizing the system will now be described. The function generator 10 is shown in detail in FIG. 3. The various parameter voltages 151 – 156 are connected over input resistors 245, 258, 353, 46, 52, 62 to a common junction 11, from which they are connected to the inverting input of an operational amplifier 12, the output of which is connected over a complex feed-back resistor 13 to the inverting input. A reference resistor 14 is connected to chassis 90. Junction 11 thus functions as a summing point, and the operational amplifier as a summing circuit. The function generator 10 provides thus at the output of the operational amplifier 12 the control value or control parameter 15 for the subsequently following control loop.

Exhaust gas sensor 41, FIG. 4: a steel jacket 411, with a thread 412 thereon includes an insulator body 413 of ceramic or porcelain. Connecting line 414 for a heater winding 415, a central electrode 416, and connecting lines 417 and 418 for a thermo-element 419 are melted into ceramic or porcelain mass. A tube 420, closed at the bottom, of zirconium dioxide, stabilized with calcium oxide is melted into the lower portion of the insulating body, the tube 420 forming a solid electrolyte which is oxygen ion conductive. The interior of the tube 420 is solidly packed with a mixture 421 formed of nickel and nickel monoxide in a stochiometric proprotion of 1:1, which functions as an oxygen reference system. The upper tip of the central electrode 416 extends into mixture 421. The outer surface of the tube 420 has a thin, gas-permeable platinum layer 422 vaporized thereon in order to form a contact layer. The electrical connection of platinum layer 422 is over one of the thermo-element conductors 417 or 418, respectively, since the thermo-element 419 is electrically connected with platinum layer 422. A heat shield 423, which is essentially cylindrical, is secured to the steel jacket, the heat shield being closed at the bottom and preferably made of heat resistant sheet steel. The heat shield 423 has apertures 424 so that exhaust gases can circulate therethrough. Heating winding 415 is formed as as a self-supporting spiral and secured by means of electrical and mechanical connection 425 to the heat shields 423 at the end remote from the steel jacket 411. Current supply for the heater winding can therefor be over the single wire 414 and the steel jacket 411, which is electrically connected to the heat shield 423.

The threaded portion 412 on the steel jacket 411 is used to screw the entire sensor 41 into a duct or pipe carrying exhaust gases, for example into an exhaust gas recirculation line 40 (FIG. 2). The exhaust gases circulate through holes 424 in shield 423 and reach the solid electrolyte tube 420, coated with platinum layer 422. The nickel, nickel-monoxide mixture 421 will cause a certain voltage to appear between platinum layer 422 and the nickel-nickel monoxide mixture, the voltage depending on the oxygen content of the exhaust gases. This voltage can be sensed at the electrical connections 416, 417 and is applied over translating circuit 43 to function generator 10.

The combination of the exhaust sensing element 41 and the translating circuit 43 is shown in FIG. 5, in which the sensor is schematically indicated at 410 in its equivalent circuit as a voltage source which, together with the previously described heater winding 415, thermo-element 419 and connection lines 414, 416, 417, 418 and 425, as well as the housing and heat shield, together form the sensing element 41. Thermo-element 419 is connected to a temperature controlled circuit 44 by means of lines 417, 418. This circuit 44, essentially, is a threshold switch which has its outputs connected over line 414 and ground, that is, chassis 90 to the heater winding 415, to provide heating current thereto. A temperature control circuit, to monitor the temperature within the exhaust gas sensor is necessary since such sensors are highly sensitive to changes in oxygen content of the exhaust gases only at specific operating temperatures. The voltage derived from the oxygen sensor itself, that is, representative of oxygen content in the exhaust gases, is applied over lines 416, 417 to a threshold switch 45 which, for example, may be a Schmitt-trigger or flip-flop circuit. The output of flip-flop 45 then will provide the voltage 154 as a function of the composition K of the exhaust gases, as previously described.

Figure 6:
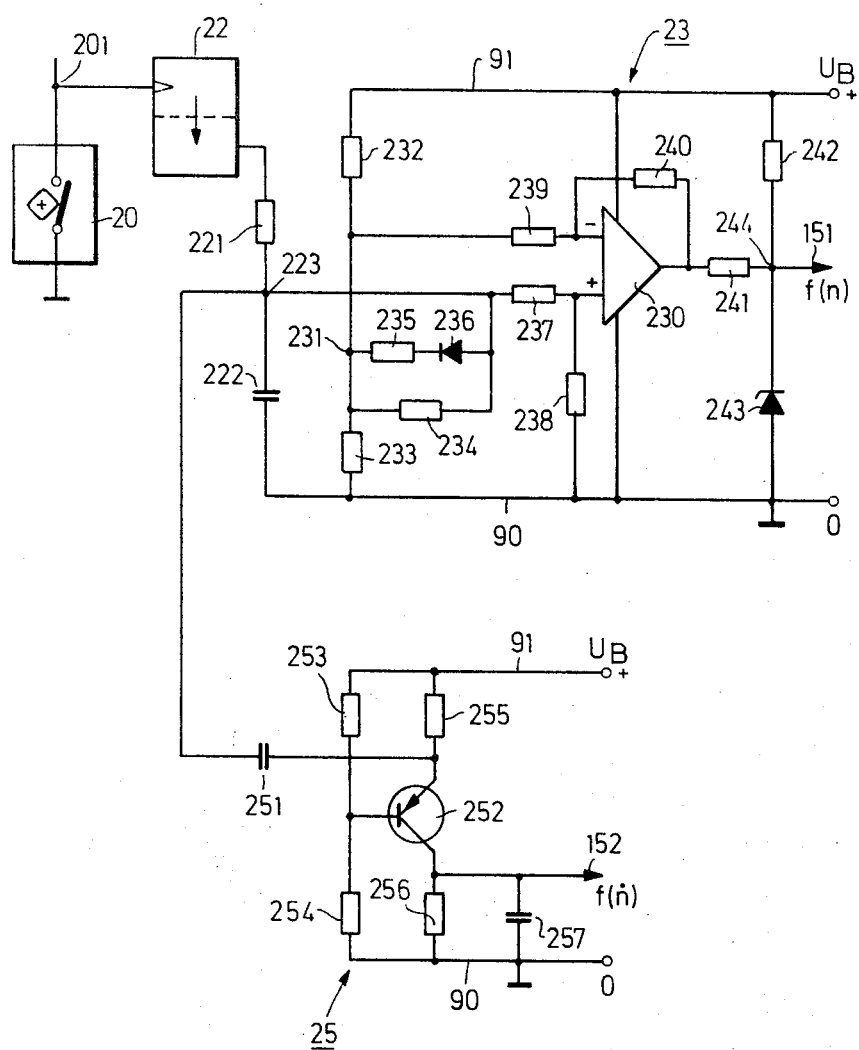
FIG. 6 is a schematic circuit diagram to obtain output signals representative of engine speed and of change in engine speed (acceleration and deceleration, corresponding respectively to positive or negative change of speed)

Generation of speed and acceleration dependent signals in connection with FIG. 6: breaker contact 20 or any other pulse source providing pulses which occur in synchronism with rotation of the engine provide pulses at a repetition rate representative of engine speed. The pulse train is applied to a monostable multi-vibrator 22, in which pulses with constant pulse width are formed. A subsequent R-C circuit which includes a resistor 221 and a capacitor 222 provide at the junction 223 thereof a voltage representative of rotational speed, that is, revolutions per time units such as revolutions per minute. The positive, non-inverting input of operational amplifier 230 has a resistor 237 connected thereto which receives voltage from the output of the speed-voltage converter 21 from junction 223, and indirectly from the junction point 231 of the voltage divider over resistor 234 and additionally over a series circuit formed of resistor 235 and diode 236. The reference resistor 238 connects the non-inverting input of the operational amplifier to chassis 90. A second input resistor 239 is additionally connected between junction 231 and the inverting, negative input of operational amplifier 230. The output signal from the operational amplifier 230 is fed back over feed-back resistor 240 to the inverting input. The output of the operational amplifier 230 is connected over output resistor 241 with a resistor 242 which is connected to the positive supply bus 91; additionally, it is connected to the cathode of a Zener diode 243, the other terminal in which is connected to chassis bus 90. The common junction formed by resistor 241, 242, and the cathode of the Zener diode 243 form the output terminal 244 of the non-linear amplifier 23 in which the output voltage 151, representative of a non-linear transfer function of engine speed is available. Operational amplifier 230 is connected, for power supply purposes, by additional connection lines between the positive and negative buses 91, 90.

Figure 7:
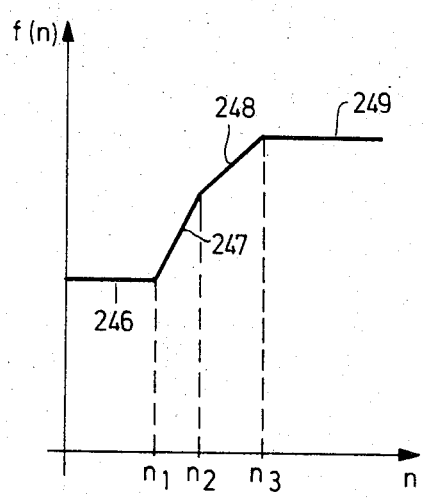
FIG. 7 is a graph illustrating the schematic circuit diagram illustrating generation of an electrical signal representative of throttle position.

To obtain a signal representative of rate of change of speed, that is, acceleration or deceleration of the vehicle, a differentiator circuit 25 is connected to the output terminal 223 of the speed-voltage transducer. Differentiator 25 includes a capacitor 251, directly connected to terminal 223 on one side and, on the other, to the emitter of a pnp transistor 252, operated in common base connection. The base is connected over a voltage divider formed of resistors 253, 254 between positive and negative buses 91, 90. The emitter of the transistor 252 is connected over emitter resistor 255 to positive bus 91 and the collector is connected over the parallel connection of the resistor 256 and capacitor 257 to chassis 90. The output voltage 152 appears across the collector network 256, 257. Positive bus 91 is connected to a source of voltage, not shown, having a supply voltage $+U_B$. The transfer characteristics of the amplifier 23 are indicated in the diagram of FIG. 7, in which the abscissa respresents speed of the engine and the ordinate represents the output as a function of speed. Up to a region of speed $n_1$, the transfer characteristic is constant as shown by the curve portion 246, the value of which is determined by resistors 241, 242 (FIG. 6). At speed $n_1$, the non-inverting input of operational amplifier 230 will have a voltage which exceeds that of the inverting input, that is, the voltage dependent on speed $n$ will exceed that being applied through the inverting input. Operational amplifier 231 will now begin to amplify, as indicated by the steep curve portion 247. The range of speed between $n_1$ and $n_2$ is determined by the relationship of resistors 239, 240. When the amplification has reached a point corresponding to speed $n_2$, diode 235 becomes conductive and, instead of resistor 234 alone, the parallel circuit of resistors 234 and 236 will become effective and, therefor, the section of curve as indicated at 248 becomes less steep. At speed $n_3$, an upper threshold now is reached as determined by the Zener voltage of Zener diode 243, as indicated at curve section 249, which is representative of the upper threshold value of the non-linear amplifier 23.

Figure 8:
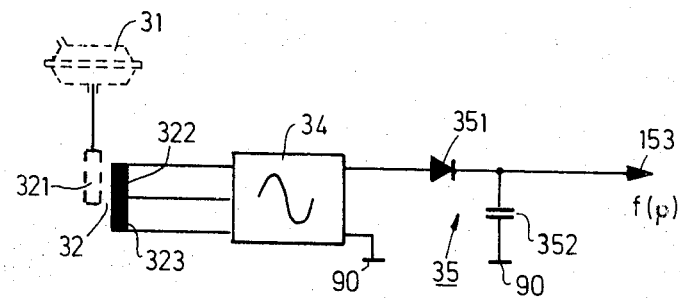

Generation of pressure signal 153, FIG. 8: as the pressure, or rather, the vacuum changes in intake manifold 30, a diaphragm in diaphragm chamber 31 is deflected and provides a mechanical output. The mechanical output changes the position of a magnetic core 321 located in the magnetic circuit of an inductive position transducer 33, having a pair of coils 322, 323. Upon change of position of core 321, the respective inductivity of the coils will change and thus effect the amplitude of an oscillator 34 connected to the coils 322, 323. The oscillator 34 is connected to an output circuit 35 which includes rectifying diode 351 and smoothing capacitor 352, the other terminal of which is connected to chassis bus 90. The junction of the cathode of diode 351 and of capacitor 352 will then provide output voltage 153.

Figure 9:
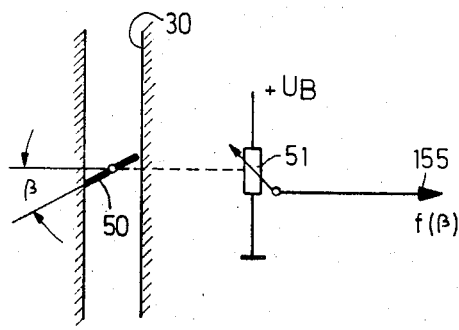

Throttle position signal, FIG. 9: A potentiometer 51, having its slider arm coupled to the throttle 50 is connected across positive source of voltage $U_B$ and chassis 90; voltage 155, representative of slider position of potentiometer 51 and hence of the angle $\beta$ of throttle 50 will be available at the output of the potentiometer 51. Rather than utilizing a potentiometer, an inductive position transducer similar to that indicated in FIG. 8, a stepping switch or other position-electrical transducer device may be used. Likewise, the potentiometer system illustrated in FIG. 9 may be used to derive an electrical output representative of deflection of the diaphragm of pressure chamber 31 (FIG. 8).

Figure 10:
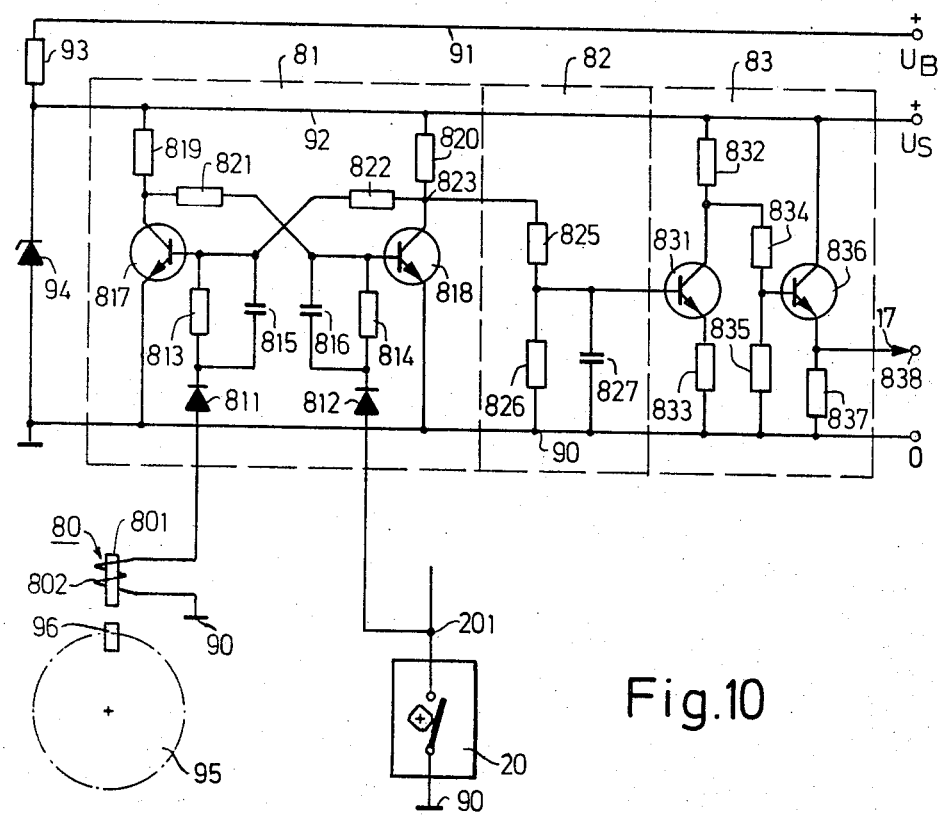
FIG. 10 is a schematic circuit diagram of a feedback circuit for use in the control loop of FIG. 1.

The feed-back circuit of FIG. 1 is shown in greater detail in FIG. 10. Only negligible variations in ignition timing, as commanded, from actual ignition timing will occur when a signal representative of actual ignition timing is fed back to the input of the ignition timing control. As illustrated in FIG. 1, the circuits 81, 82, and 83 form such a feed-back loop. These circuits are shown in detail in FIG. 10. Supply of circuits 81, 82, 83 is obtained over a supply bus 92 which provides a stabilized supply voltage $U_S$. A stabilization circuit which is simple and effective, as shown in FIG. 10, includes a resistor 93 interconnecting positive source $U_B$ and thus positive bus 91 and stabilized bus $U_S$. A Zener diode 94 is connected at the junction of resistor 93 and ground bus 90. Other systems and circuits to supply stabilized volage to bus 92 can be used, the type of stabilization circuits being employed depending essentially on design considerations and requirements of the degree of stabilization, costs, and the like.

FIG. 10 shows, schematically, junction 201 from which pulses representative of engine speed are derived, as well as the magnetic pulse source 80. Bi-stable flipflop 81 includes a pair of npn transistors 817, 818, the emitters of which are connected to chassis line 90. The bases of transistors 817, 818 are each connected to a parallel circuit formed of a base resistor 813, 814, respectively, and a capacitor 815, 816, respectively. Input to the respective resistors is connected over respective diodes 811, 812, the input terminals being the anodes of the diodes. The collectors of transistors 817, 818 are each connected over a collector resistor 819, 820 to stabilized supply bus 92. The collector of transistor 817 is coupled over coupling resistor 821 with the base of the second transistor 818 and, likewise, the collector of transistor 818 is connected over coupling resistor 822 with the base of the first transistor 817. The bi-stable flipflop 81 is set by pulses from the first diode 11, that is, pulses derived from pulse source 18 and is reset by pulses derived from terminal 201, that is, from breaker contacts 20 and connected over the second diode 812. Core 801, of ferro-magnetic material and surrounded by a coil 802 has one terminal connected to chassis and the other to diode 811. Square wave pulses derived at the output terminal 823 of flipflop 81 are converted in subsequent circuit 82 to a smooth average voltage, in order to provide an averaged output. Circuit 82 has an input resistor 825 which is connected to ground over parallel circuit formed of resistor 826 and capacitor 827. The junction of resistors 825, 826 and capacitor 827 form the output of circuit 82, and is connected to the base of a subsequent npn transistor 831 forming a subsequent amplifier 83. The emitter of transistor 831 is connected over emitter resistor 833 to chassis 90. The collector of transistor 831 is connected over collector resistor 832 to the stabilized supply bus 92 and, over coupling resistor 834 to the base of a second transistor 36. Base resistor 835 is connected between the base and chassis bus 90. Transistor 836 has its collector connected directly to the stabilized supply line 92 and its emitter over emitter resistor 837 to chassis bus 90. The output terminal 838, having output voltage 17 appearing thereat, is connected to the emitter of transistor 836, to provide a feed-back voltage to the control loop.

Figure 11:
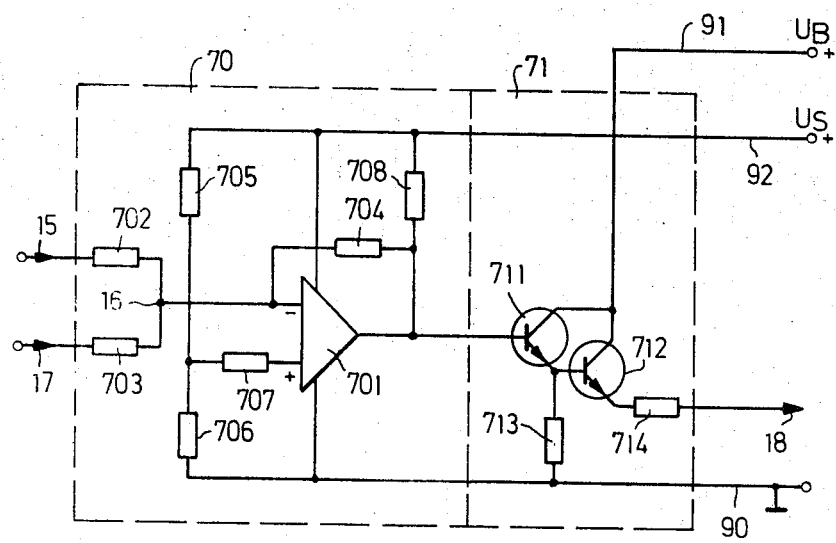
FIG. 11 is a schematic circuit diagram of a control amplifier, reference No. 70, in FIG. 1.
Figure 12:
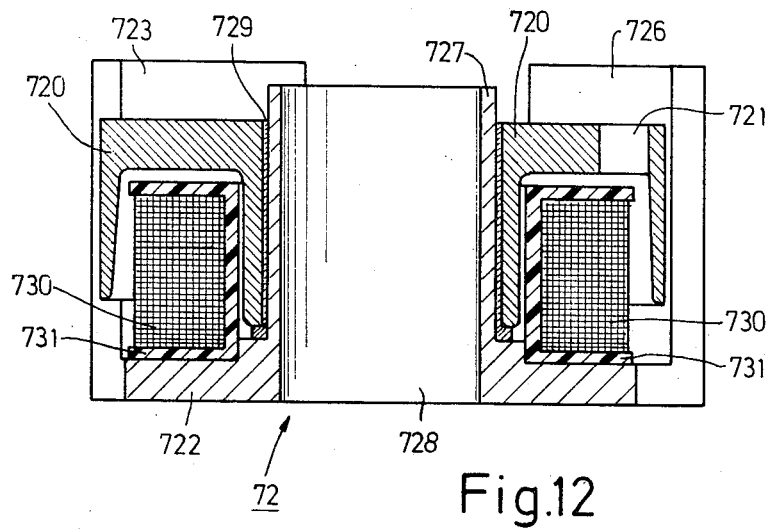
FIG. 12 is a cross sectional schematic view of the adjustment portion of a breaker pulse source, taken along line XII — XII of FIG. 13, but omitting the breaker contacts.

Control amplifier 70 and power amplifier 71, with reference to FIG. 11: the control amplifier 70 essentially includes an operational amplifier 701 connected as a summing amplifier, having a summing point 16 connected to the inverting input of operational amplifier 701. Summing point 16 is connected by an input resistor 702 to have the input control signal 15 applied thereto; input resistor 703 connected to have the feedback control signal 17 applied thereto. The output signal from the operational amplifier 701 is fed back over resistor 704. The non-inverting input of operational amplifier 701 is connected over a resistor 707 to the tap point of a voltage divider formed of resistors 705, 706 which is connected between the stabilized voltage bus 92 and chassis 90. Operational amplifier 701 is connected to buses 92 and 90 for power supply. The output of the operational amplifier 701 is also connected over resistor 708 to bus 92 and to the input of power amplifier 71, which essentially includes a transistor 711 and a second transistor 712. The output of control amplifier 70 is connected to the base of transistor 711, the collector of which is connected, together with the collector of transistor 712 to positive bus 91. The emitter of transistor 711 is connected to the base of transistor 712 and over emitter-resistor 713 to chassis bus 90. The output from power amplifier 71 is taken from emitter-resistor 714 to provide the output signal 18. Distributor timing adjuster 72 and breaker point system 20, with reference to FIGS. 12 and 13: breaker contacts have been omitted from a showing in FIG. 12 for clarity. A fixed support element 72, of ferromagnetic material, has four outwardly directed pole pieces 723, 724, 725, 726 and a central, hollow piece 727. For operation, a freely rotatable distributor or breaker shaft, having a cam attachment 209 can be located in bore 728 of the central tubular element 727.

Figure 13:
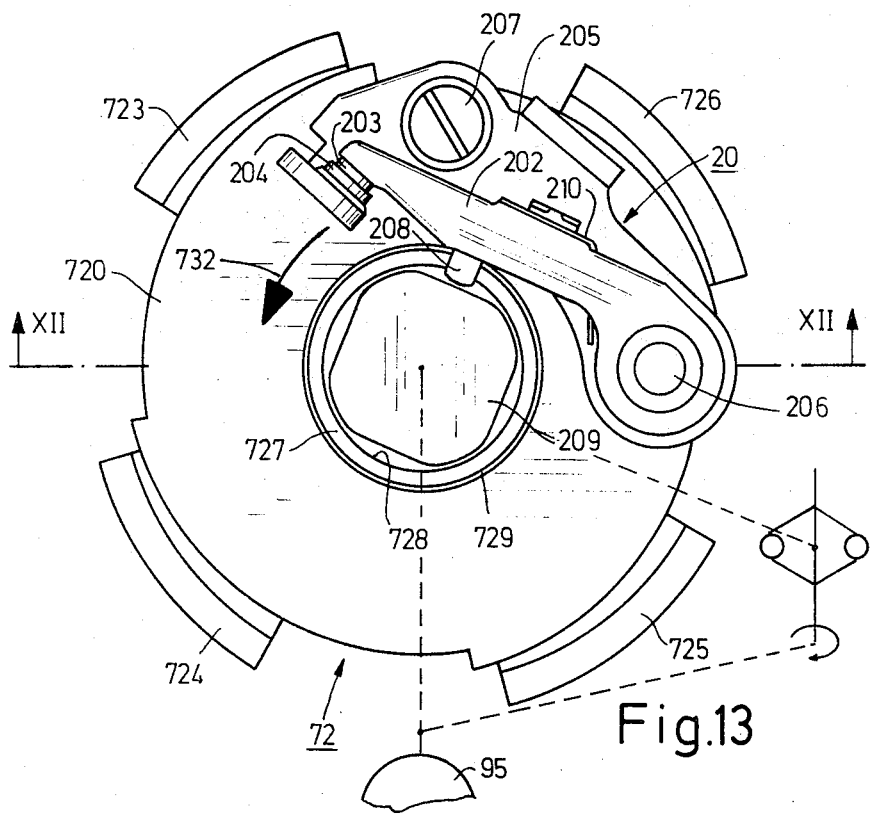
FIG. 13 is a schematic top view of the breaker contact assembly of FIG. 12, omitting non-essential parts.

A ring-shaped space between poles 723–726 and a central element 727 is taken up by a magnetic winding 730 wound on a winding spool 731. The spool body 731 is made of insulating material. The central element 727 has a brass bushing 729 placed thereover which forms a bearing for a pole ring 720 which is rotatable with respect to the fixed base or support 722 against the force of a spring, not shown in the drawings, and exerting a force counter to the direction of the arrow 732 (FIG. 13). The ring 720 is formed with a ring-shaped hollow space which includes the magnetic winding 730. The pole ring 720, on the top, is at the same time the breaker point carrier. It is formed with a bore 721 to receive the attachment bolt 206 for the breaker contact, as shown in FIG. 13.

The assembly of the breaker contacts 20 secured to the rotatable magnet system 72 is seen in FIG. 13, in top view. The rotatable pole ring has fan-shaped offset or staggard flanges at its circumference which, together with the pole 723–726 form air gaps of variable dimension. When the magnet winding 730 is energized, the pole ring 20 will be rotated in the direction of arrow 732, with respect to the poles 723–726 or the fixed support elements 722, to counter the spring force of the spring, not shown. Thus, the breaker contacts, that is, the interrupting elements 20 will be changed relatively to the cam element 209 extending from bore 728, so that the timing of the interrupting pulse, that is, of opening of the breaker contact changes with respect to instantaneous distributor shaft position.

The pulse source 20 itself has a breaker arm 202 connected to bolt 206 and rotatably mounted on carrier 205. It is biased by a spring 210 in the direction of the cam 209. Contacts 203–204 are located on the arm and on the based 205, respectively. The cam 209 can swing the breaker arm radially outwardly counter the force of spring 210. The breaker contact gap, that is, the spacing between contacts 203–204 can be adjusted by means of an adjustment screw 207 when the cam is in contact-open position, that is, when the land of cam 209 is engaged in center position with cam follower button 208 secured to arm 202.

Figure 15:
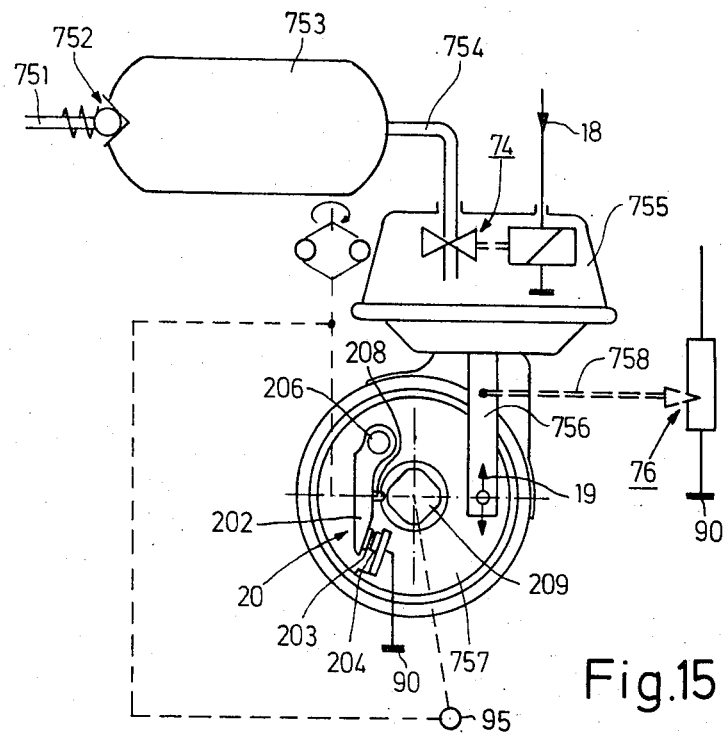
FIG. 15 is a schematic diagram illustrating adjustment of breaker contact timing by utilizing vacuum as adjustment force.

The breaker-pulse generator 20 and the rotary magnet system 72 can also be constructed differently; for example, the force 19 can be used to adjust the position of the cam element 209 with respect to the distributor shaft; the distributor base plate can then remain fixed. The arrangement with a fixed breaker plate 757, which does not change position is shown in FIG. 15. The principle of change of timing essentially resides in changing the relative position of the mechanism which causes opening of the contacts with respect to the instantaneous position of the distributor shaft. In both forms of the invention — FIG. 13 or FIG. 15, the cam 209 can additionally be changed in dependence on engine speed by a centrifugal adjustment device, as known by a certain angle of shift. The servo force 19 additionally adds to this change of position of cam 209 or the cam follower 208, respectively, or both with respect to the instantaneous angle of position of the distributor shaft and, hence, the crank shaft of the engine. Shift, or angular timing change with respect to speed and based on purely mechanical change caused by a centrifugal device may not be needed and a servo force 19 can be utilized to effect any change or shift of timing for all purposes.

Figure 14:
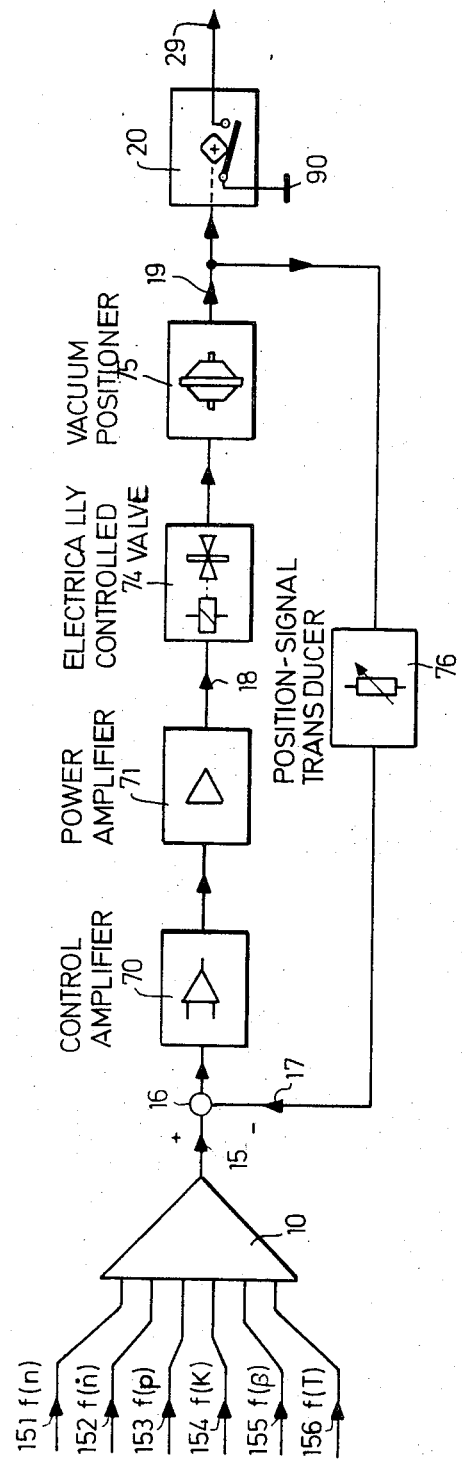
FIG. 14 is a schematic diagram of another embodiment of a control loop.

Embodiment of FIG. 14: The actual ignition timing, or positioning, can be indirectly fed back by sensing the position of the support plate for the breaker contacts of the breaker pulse source 20 and deriving therefrom an electrical signal in the position-signal transducer 76 to provide the feedback signal 17 to a summing point 16 of the control loop, to be there compared with the composite command signal 15 derived from the function generator 10 which, in turn, provides a signal which is a composite of the input signals 151–156. The signal at junction 16 is again amplified on control amplifier 70 and power amplifier 71 to provide a power control signal 18. Issuing from the embodiment of FIG. 1, however, an electro-magnetically operated control valve 74 is used to control a vacuum-positioning system 75. The vacuum-positioning system 75 provides the necessary servo output force 19 in order to set the ignition timing, and to provide the output signal 29 of the control loop. A control valve and vacuum-positioning system can also be used in the feedback loop in accordance with FIG. 1 instead of the rotary magnet system 72. The position-signal transducer 76 may be similar to the position-signal transducer 51 described in connection with FIG. 9, or elements 31–32 (FIG. 8).

Details of control loop of FIG. 14, with reference to FIG. 15: The portion of the control loop formed of element 74–75, 20 and 76 are again shown in detail in FIG. 15. Output signal 18 is connected to the coil-forming part of the electro-magnetic operating valve 74. Valve 74 is a diaphragm unit connected by means of line 754 and air supply vessel 753 which, in turn, is connected by means of a ball valve 752 and an inlet duct 751 to the suction tube of the inlet manifold or inlet pipe 30 (FIG. 2) of the internal combustion engine. Control valve 74 is placed in connection with line 754 and the outlet thereof is connected to the diaphragm chamber 755 having a membrane which is connected by means of a linkage arrangement 756 to the distributor breaker support plate 757, to apply the control force 19 thereto. The fixed connection 758, simultaneously, shifts the slider of potentiometer 76 to form a position transducer, one terminal of which is connected to chassis and the other to a source of voltage. The breaker arm 202 is connected by means of bolt 206 to the support plate 757 of the distributor breaker contact assembly. Breaker arm 202 has contact button 203, and a cam follower 208 connected thereto. Contact button 203 is located opposite contact button 204 which is connected to the chassis bus or ground 90, and fixed to the plate 757. The breaker pulse source 20 is shown in the open position, that is, cam 209 engaging cam follower 208. The breaker operation is similar in both embodiments of FIGS. 13 and 15. The feedback position transducer 76 may also be constructed similar to an inductive position transducer (see FIG. 8) or may be a friction-free potentiometer resistant to constant movement.

The magnetically controlled valve 74 applies vacuum into vacuum diaphragm chamber 755 to determine the ignition timing. Connection between the vacuum chamber 755 and the air vessel 753 is momentarily established and interrupted, or, if desired, analogously, continuously variable valves can be used. The type of valve itself is a matter of design; pulse energized valves which are constantly subjected to differential air pressure may also be used. If the pressure vessel is directly coupled to the engine, then, in accordance with a preferred embodiment, the pulse breaker 20 can not change timing when there is no vacuum, for example, when the engine is stopped or the vacuum system is out of order. Yet, even if just a slight amount of vacuum is present, as may occur when the engine is operated at full loading, maximum possible change in position of the vacuum breaker points should be possible.

Figure 16:
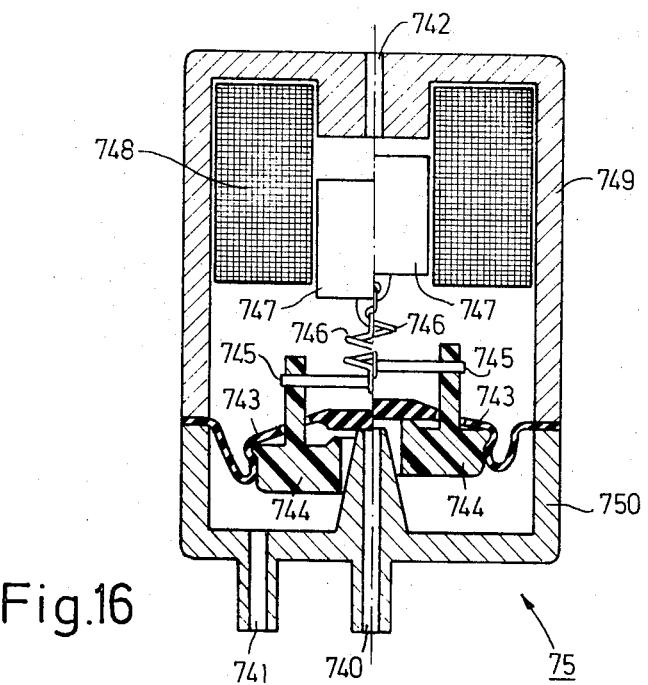
FIG. 16 is a schematic longitudinal cross sectional view illustrating a control valve.

The control valve 74 which operates on the analog principle is shown in FIG. 16; the left half of the illustration shows the valve in quiescent state, and the right half shows the valve in an energized state.

Valve 74 is located in a housing which has an upper housing portion 249 and a lower housing portion 250, and an elastic membrane 743 secured between the housing portions. The elastic membrane itself is tightly connected to a switching element 744 which is preferably a plastic injection element, or a plastic molding. Element 744 has a pair of extensions, each formed with a bore into which a holder 745 for a helical spring 746 is inserted. Spring 746 is suspended in an eyelet hook at the end remote from holder 745 which forms part of an armature 747. Armature 747 is slidably mounted within an excitation winding 748 located in the upper portion 749 of the housing. Upwardly of the armature, housing 749 is formed with a vent opening 742. A conical projection connected to supply line 740 is formed in the lower housing 750, line 740 being connected to duct or vacuum line 754 and hence with the air supply vessel 753 (FIG. 15). A stud 741 connects to the utilization device, that is, to the vacuum pressure diaphragm vessel 755.

Operation: In quiescent condition, armature 747 is at the low point, as illustrated in the left half of FIG. 16. In this position, the space beneath the membrane 743, that is, the space in housing portion 750 is vented. A connection is provided between the central bore of element 744, the opening in the membrane 743, and the projections of the body 744 past the winding 748 and to the vent opening 742. The supply line 740 is separated from the system by the seat centrally of the membrane 743.

Upon excitation of the magnet winding 748, armature 747 will shift upwardly and carry along the element 744. The vent openings in membrane 743 extending around the projections of the element 744 will close, due to the lift of the element 744 and membrane 743 will be lifted off the conical tip forming the end of the supply line 740. Vacuum within the valve space beneath the membrane and, with it, in the vacuum diaphragm chamber 755 will rise. Membrane 743, and with it element 744 will be pulled back, to counter the force of magnetic attraction of the armature by throttling the venting of the vacuum chamber, and by controlling the repetition rate of the application of vacuum, and thus matching the rate of change of vacuum to the maximum negative possible change of position in the system.

The control system of the present invention permits adjusting the ignition timing not only in dependence on engine speed, or on engine inlet vacuum, respectively, but rather to permit any desired one, or any desired number of engine operating and ambient conditions and parameters to control ignition timing. This permits control, among others, of the composition of exhaust gases which is greatly influenced by ignition timing; the exhaust gas composition itself can be utilized as a control parameter, thus providing a closed feedback loop in which exhaust gas composition is sensed and, converted to an appropriate control signal system having an appropriate transfer function, to in turn control the ignition timing. The control circuits can be so set that the timing of the ignition pulses changes by either changing the position of the support plates 757 with respect to the cam 209 of the breaker contacts, or to change the cam, respectively; the timing of the breaker pulse source 20 can thus be set by a servo force either by an auxiliary angle, for advance or retard ignition; the cam element 209 itself being either separately controlled by the centrifugal control, or the support plate 757 can be separately controlled by a vacuum controller. This initial control may already change the ignition timing by a predetermined angle from dead-center ignition pulsing, the servo force adding, or subtracting to this additional change, or providing the entire displacement force for the changing of ignition timing. Thus, a versatile system is provided which can be used as an additional control system to existing equipment or can supersede existing control systems entirely.

The transfer function of the control parameters with respect to the ignition timing can be accurately matched to engine performance and engine requirements, thus, the ignition timing is not determined only by speed so that the spark is advanced as the speed increases, necessarily, as is the case if only centrifugal controllers are used; the rate of change can be non-linear, and the ignition timing itself be matched to both engine operating performance as well as engine conditions and then existing engine operating parameters, such as, for example, changes in exhaust gas ignition.

The present invention can be utilized both with mechanical breaker contacts (as shown and described) as well as with electronic ignition systems, and contactless interrupter and distributor systems, as well as for various control systems for use with internal combustion engines. The control force 18, in the form of an electrical output signal, can thus be utilized to control the ignition timing, or interruption timing of electronic ignition systems by providing a suitable control voltage to change the interruption or gating time instant of an electronic ignition system with respect to shaft position. The function generator 10 can have additional and other operating parameters, in the form of electrical signals applied thereto, such as, for example, ambient temperature, exhaust gas temperature, ambient air pressure or the like.

The function generator 10 and the control and power amplifiers 70, 71 can all be combined in a signle unit, and the feedback signal 17 likewise fed into the single unit, with appropriate polarity, for example, directly to the function generator 10.

Various changes and modifications may be made within the scope of the inventive concept.

We claim:

1. An ignition system for internal combustion engines comprising:
   a distributor (20) having breaker means (FIGS. 13, 15: 202, 203, 204) operating in synchronization with engine rotation and providing ignition pulses, the breaker means being adjustable (19) with respect to the angular position of the engine shaft to set the timing of the ignition pulses in relation to the cylical operation of the engine;
   an electro-mechanical control loop controlling the timing of the breaker means in dependence on at least one of the operating parameters of the engine:

a. Speed ( $f(n)$ ),
   b. Intake manifold vacuum ( $f(p)$ ),
   said control loop including:
   electrical transducer means responsive to at least one of said parameters;
   electrical control amplifier means (70, 71) amplifying the signal from said transducer means;
   means (80, 95, 96) for generating pulses in synchronization with engine rotation;
   detection means (81) having the ignition pulses from the breaker means and the engine rotation pulses applied thereto and generating an error signal upon asynchronism of the ignition and the rotation pulses;

a feedback circuit (82, 83, 17, 16) having said error signal applied thereto and feeding said error signal to said control amplifier means; and
   means (72, 74) for receiving control input from the control amplifier means to provide an output operating force (19) acting on said distributor (20) and connected to control the timing of the breaker means in dependence on the engine operating parameter, or parameters to which the transducer means responds.

2. A system according to claim 1 wherein the means to provide an output operating force comprises electromagnetic mechanical transducer means to provide a mechanical positioning force as a function of engine operating parameter, or parameters.

3. A system according to claim 1 wherein the means to provide an output operating force comprises electrical-fluid valve means (FIG. 15: 74) and fluid-positioning means (75) having a mechanical positioning output to provide a mechanical positioning force as a function of engine-operating parameter, or parameters.

4. A system according to claim 1 wherein the sensing means comprises:
   a bistable flip-flop (81);
   means to trigger the flip-flop to change state in one direction under the control of the ignition pulses from the breaker means and to change state in another direction under the control of the engine rotation pulses;
   and the feedback circuit comprises an averaging circuit (82) having its output connected to the flip-flop, the output of the averaging circuit being connected to the control amplifier means (70, 71) to provide a closed control loop and introduce a correction signal thereto if the commanded ignition pulses are not in accordance with engine speed.

5. A system in accordance with claim 1 wherein the pulse generating means (96, 80) are operatively connected to the flywheel (95) of the engine and provide pulses in synchronism with engine rotation.

6. A system in accordance with claim 5 wherein the engine rotation pulses are timed with respect to engine pulses such that the flip-flop changes state to one state and is immediately reset to another state.

7. A system in accordance with claim 1 wherein the control loop further comprises a function generator (10), the control amplifier means (70, 71) being connected to the output of the function generator;
   and the output from at least one of said transducer means is applied to said function generator to provide a derived control signal for said amplifying means.

8. A system in accordance with claim 7 wherein the engine speed transducer means (20) is responsive to engine speed and provides an output speed signal (151);
   vacuum transducer means are provided responsive to intake manifold vacuum in providing a vacuum signal (153);
   means (25) for receiving said speed signal and generating a first derivative signal responsive to the rate of change in speed and hence acceleration and deceleration of the engine and providing a derivative signal (152);

said engine speed signal, said engine vacuum signal and said first derivative signal being applied to the input of said function generator means.

9. A system in accordance with claim 7 wherein an exhaust gas composition transducer means (41) is provided responsive to composition of the exhaust gases and providing an exhaust gas signal (154), said exhaust gas signal being applied to the input of said function generator means.

10. A system in accordance with claim 7 wherein an engine throttle position transducer is provided responsive to engine throttle position and providing a throttle position output signal (155), said engine throttle position signal being applied to said function generator means.

11. A system in accordance with claim 7 wherein an engine temperature transducer (60) is provided responsive to the engine temperature and providing a temperature output signal (156).

12. A system in accordance with claim 7 including a summing circuit (16) to sum the signal from said function generator.

13. A system in accordance with claim 7 wherein the function generator means (10) comprises an operational amplifier (12) connected as a summing circuit, the summing junction (11) forming the input to the operational amplifier.

14. A system in accordance with claim 8 wherein the engine speed transducer comprises a pulse repetition rate (PRR)-voltage conversion circuit (21) having pulses recurring in synchronism with engine rotation applied thereto;
a non-linear amplifier (23) connected to the output of the PRR conversion circuit (21) and providing said speed output signal;
and wherein the derivative speed generating means comprises a differentiator (25) having its input connected to the output of the PRR conversion circuit (21).

15. A system in accordance with claim 14 wherein a PRR conversion circuit comprises (FIG. 6) a monostable flip-flop (22) having an R-C circuit (221, 222) connected thereto.

16. A system in accordance with claim 14 wherein the non-linear amplifier means (23) comprises (FIG. 6) an operational amplifier (230) having a diode-resistor network (234, 235, 236) connected to its input circuit.

17. A system in accordance with claim 16 which further comprises a voltage divider circuit (90, 91; 232, 233), the diode-resistor network being connected to said voltage divider circuit.

18. A system in accordance with claim 17 wherein the voltage divider (232, 233) has a tap point (231), said R-C network comprising a first resistor (234) connected to the tap point (231);
a second resistor (235) and diode (236) in series therewith connected to the tap point (231), and a third resistor (237) connected to said first resistor (234) and to the series circuit of the second resistor (235 and the diode (236), the third resistor (237) being connected to the non-inverting input of the operational amplifier (230);
and a further resistor (239) connected to the tap point (231) and the inverting input of the operational amplifier (230).

19. A system in accordance with claim 16 further comprising means (238) providing a reference voltage for non-inverting input of the operational amplifier (230);
and a resistive feedback circuit (240) interconnecting the output of the operational amplifier and the inverting input thereof.

20. A system in accordance with claim 16 further comprising a resistor (242) and a Zener diode (243) in series and providing a limiting voltage means;
a resistor (241) interconnecting the output of the operational amplifier (230) and the limiting voltage means, the junction (240) of the resistor (241) and the limiting voltage means forming the output (151) of the non-linear amplifier (23).

21. A system in accordance with claim 8 wherein the intake vacuum transducer means comprises (FIG. 8) a vacuum diaphragm chamber (31) located in pressure responsive relation to the intake manifold of the engine;
and position transducer means (32, 34, 35) responsive to the deflection of the diaphragm in the chamber and providing said vacuum signal (153).

22. A system in accordance with claim 9 wherein the exhaust gas composition transducer means comprises (FIG. 5) a sensing element (41) exposed to the exhaust gases from the engine;
and a signal translation circuit (43) translating the output from the sensing element and providing said exhaust gas signal (154).

23. A system in accordance with claim 22 wherein the translating circuit comprises a thermal sensing means (419) sensing the operating temperature of the sensing element;
and heating means (415) applying heat to the sensing element when the sensing means is below a predetermined temperature.

24. A system in accordance with claim 10 wherein the engine throttle position transducer means comprises a potentiometer (51) with a non-linear position-resistance characteristic having a variable slider arm coupled to move with movement of the throttle (50);
and a reference voltage ($U_B$) connected across the potentiometer.

25. A system in accordance with claim 1 wherein the control loop comprises means (FIG. 14: 76) for generating a command signal (17) representative of commanded timing of the breaker means in relation to engine operations;
and means (16) comparing the commanded signal with a signal controlling the means (72, 74) generating the output force to provide a controlled error signal.

26. A system in accordance with claim 2 wherein the electro magnetic-mechanical transducer means comprises a rotary magnet means (72).

27. A system in accordance with claim 3 wherein the electro-fluid valve means comprises a vacuum diaphragm chamber (755) and a control valve (74) controlling the connection of vacuum from the engine intake manifold to the vacuum chamber.

28. A system in accordance with claim 1 wherein the distributor means (20) comprises (FIG. 15) a cam part (209) and a contact part (757) carrying the breaker contacts (203, 204), said cam part being relatively movable with respect to the contact part in addition to movement of the cam part in synchronism with engine operation;

and wherein the output operating force generating means are connected to the cam part (209).

29. A system in accordance with claim 1 wherein the distributor means (20) comprises a cam part (209) and a contact part (257) carrying the breaker contacts, said cam part being relatively movable with respect to the contact part in addition to movement of the cam part in synchronism with engine operation;

and wherein the output operating force generating means are connected to said contact part (757).

30. A system in accordance with claim 28 wherein the distributor (20) additionally comprises centrifugally operated means responsive to engine speed changing the relative position of said contact part with respect to cyclical engine operation to change the timing of the spark pulses.

31. A system in accordance with claim 29 wherein the distributor additionally comprises centrifugally operable means responsive to engine speed changing the relative position of said contact part with respect to cyclical engine operation to change the timing of said spark pulses.

32. A system in accordance with claim 28 wherein the distributor (20) additionally comprises centrifugally operable means responsive to engine speed changing the relative position of said cam part with respect to cyclical engine operation to change the timing of the spark pulses.

33. A system in accordance with claim 29 wherein the distributor (20) additionally comprises centrifugally operating means responsive to engine speed changing the relative position of said cam part with respect to cyclical engine operation to change the timing of the spark pulses.

34. A method of controlling the ignition timing of internal combustion engines having an ignition pulse generating means comprising the steps of generating an electrical signal representative of at least one engine operating parameter;

translating said signal into a mechanical force representative of a change of ignition timing upon change of operating conditions of the engine;

applying said force to the ignition pulse generating means in a direction to change the timing of said ignition pulse generating means with respect to cyclical operation of the engine;

generating a signal in synchronism with actual engine rotation;

generating an electrical signal representative of timing of commanded ignition pulses as determined by the application of said force;

detecting discrepancies between said actual engine rotation signal and said commanded ignition pulse signal;

deriving an error signal representative of said discrepancy;

and modifying said electrical signal representative of engine operating parameters by said error signal in a direction to null said error signal.

35. A method in accordance with claim 34 wherein the step of generating an electrical signal representative of engine operating parameters comprises generating at least three of the signals representative of engine intake vacuum, engine speed, change in engine speed, exhaust gas composition, engine temperature;

and comprising the step of forming a composite control signal, said composite control signal forming the signal being translated into the mechanical force.

* * * * *